United States Patent Office 3,276,443
Patented Oct. 4, 1966

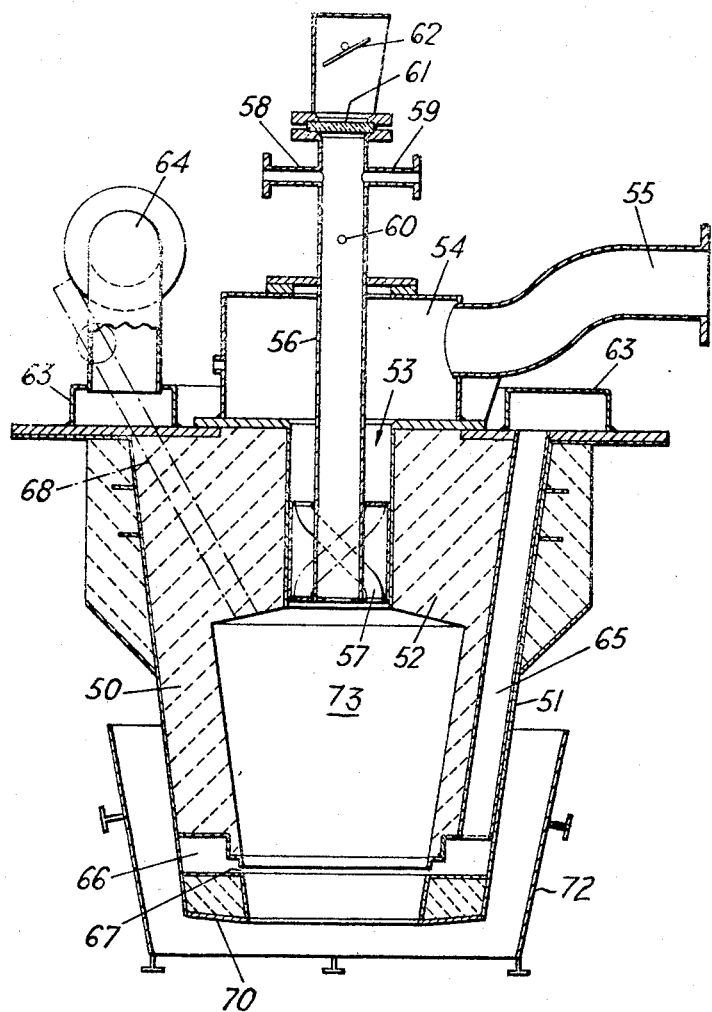

3,276,443
SUBMERGED HEATER APPARATUS
James Austin, Maidenhead, and John D. Ellis, Chalfont St.
Giles, England, assignors to Occidental Research & Engineering Limited, London, England, a corporation of England
Filed Mar. 16, 1965, Ser. No. 440,239
Claims priority, application Great Britain, July 21, 1964, 29,522/64
18 Claims. (Cl. 126—360)

This invention concerns submerged heater and like techniques in which a liquid is heated by direct exposure to hot combustion products. The invention has especial reference to the use of such techniques for concentrating phosphoric acids for the production of pohsphoric acids of high $P_2O_5$ content. For the purposes of this specification, the expression "phosphoric acids of high $P_2O_5$ content" is to be understood as meaning phosphoric acids containing not less than 68% $P_2O_5$ w./w. (weight of acid to weight of solution) on an impurity-free basis (IFB) (calculated as the percentage by weight of $P_2O_5$ in relation to the total weight of $P_2O_5$ plus both free and combined water in the acid concerned) and includes the acids known as "superphosphoric acids" having $P_2O_5$ contents in the range 68–79% w./w. (IFB), acids having $P_2O_5$ contents in the range of 79–89% w./w. (IFB) which may conveniently be called "astrophosphoric acids" and acids containing in excess of 89% w./w. $P_2O_5$ (IFB), called "ultraphosphoric acids" herein.

The commercial production of phosphoric acids is generally undertaken by one of two general procedures, viz: the "wet process" in which bone ash or, more usually, ground phosphate rock, containing apatite

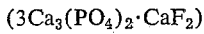

and/or tricalcium phosphate $(Ca_3(PO_4)_2)$ is digested with dilute mineral acid (e.g. sulphuric acid) to produce a weak orthophosphoric acid solution and a calcium salt which is then separated from the solution by an appropriate technique; and the "furnace process." The "wet process" acid is normally produced at low strength (e.g. 27–33% $P_2O_5$ w./w. (IFB)) and although it should desirably be concentrated to higher strengths prior to use in, for instance, the production of fertilizer compositions it is nevertheless a very convenient, readily available and economic material for bulk production of fertilizer and other phosphate compositions.

Generally, wet-process phosphoric acid has, as noted, a $P_2O_5$ content in range 27–33% w./w. (IFB), the $P_2O_5$ being substantially entirely present in the form of orthophosphoric acid $(H_3PO_4)$. It also contains impurities such as calcium, iron, aluminum, magnesium and other metals together with fluorine compounds and other contaminants, the amount and nature of the impurities depending upon the raw materials used in its preparation. Concentration of this weak acid to higher strength involves evaporation of the water of solution and for concentration to $P_2O_5$ contents of up to about 68% w./w. (IFB) many evaporation techniques are available. In selecting an evaporation technique for this purpose, account must be taken of the corrosive nature of the acid, which involves problems in the selection of materials of construction, and also of the problem of scale formation on heat transfer surfaces since the impurities in the acid are such as to conduce to the rapid accretion of a hard scale of calcium salts (sulphate and phosphate) on any high temperature surfaces in contact with the acid. For these reasons, techniques involving indirect heating of the acid are difficult to apply and tend to have a low thermal efficiency.

Evaporation by submerged combustion and analogous techniques, in which heating is accomplished by direct exposure of the liquid to hot combustion products and which are of very high thermal efficiency, would, on the other hand, appear to avoid the problem of scale formation on heat transfer surfaces, ease the problem of selecting constructional materials and also show high thermal efficiency and other economic advantages in concentrating wet-process phosphoric acid. However, this application of such techniques has up to recently been prevented by the problem of dealing satisfactorily and economically with the noxious effluent that would be produced by the evaporator but this problem has now been overcome by the effluent-treatment apparatus disclosed in our co-pending application Serial No. 440,184, filed March 16, 1965.

The problems involved in concentrating wet-process phosphoric acid to $P_2O_5$ contents above about 68% w./w. (IFB) are considerably more severe than those involved in concentrating such acid up to about this strength. Not only are there greater problems in selecting suitable materials of construction capable of withstanding the higher temperatures and more corrosive conditions imposed, but, in addition, the problems of scale formation on heat transfer surfaces are much increased by the tendency of hot concentrated phosphoric acid to form insoluble polyphosphates and metaphosphates with certain of the impurities normally found in the wet-process acid.

Thus it should be recalled that phosphoric acid exists in many forms; there are, for instance, orthophosphoric acid $(H_3PO_4)$, pyrophosphoric acid $(H_4P_2O_7)$, polyphosphoric acids (three or more orthophosphoric acid units condensed with elimination of water molecules) and metaphosphoric acid $(HPO_3)$ which occurs in cyclic polymers (see "Phosphorus and its Compounds," vol. 1, by John R. Van Wazer, published by Interscience (New York), 1958). Pure aqueous solutions of $P_2O_5$ in concentrations up to about 68% w./w. contain substantially only orthophosphoric acid; above this $P_2O_5$ content, increasing amounts of pyrophosphoric acid and other polyphosphoric acids appears. For instance at a $P_2O_5$ content of 79% w./w., the solution may be found to contain 20% orthophosphoric acid, 46% pyrophosphoric acid, 20% tripolyphosphoric acid, 8% tetrapolyphosphoric acid, 3% pentapolyphosphoric acid and 1% hexapolyphosphoric acid. At a $P_2O_5$ content of 84% w./w. the proportion of orthophosphoric acid has fallen to about 3% and the proportion of pyrophosphoric acid to 10%, the bulk of the $P_2O_5$ being present in the form of polyphosphoric acids, those polyphosphoric acids including ten or more orthophosphoric acid units accounting for at least 25% of the $P_2O_5$ content. At a $P_2O_5$ content greater than 87% w./w. the constitution changes, concentrates having $P_2O_5$ contents rising above this value consisting to increasing extents of crosslinked polyphosphoric acids and polymers of metaphosphoric acid units.

During concentration of phosphoric acid solutions by evaporation, local high temperatures and concentration gradients affect the proportional distribution of the various forms of the acid; in concentrating a wet-process acid, the normal impurities found therein include calcium, iron and aluminum cations which react with the higher polyphosphoric and polymeric metaphosphoric acids to form insoluble compounds the formation of which conduces to the formation of such forms of the acid by disturbing the equilibrium distribution of the various forms of the acid. Thus the concentration of wet-process acid to $P_2O_5$ contents in excess of about 68% w./w. (IFB) leads to the formation of unexpectedly large amounts of insoluble polyphosphates and metaphosphates as hard scale on heat-transfer surfaces of the evaporator.

For this reason, evaporation techniques involving indirect heat transfer to the acid are, as a practical matter, entirely ruled out for the large-scale, economic concentration of wet-process phosphoric acid to $P_2O_5$ contents above about 73% w./w. (IFB). For such purposes a submerged combustion or analogous technique is essential.

However, it has been found that the obtaining of phosphoric acids of high $P_2O_5$ content and desirable composition, on a large scale, by submerged combustion or like evaporation techniques is not altogether straightforward.

Thus, whereas a small evaporator with, for instance, a burner arrangement of conventional design operating at a heat release rate of up to about 1 million B.t.u. per hour can concentrate a wet-process acid to high $P_2O_5$ content with the expected distribution of polymeric acids and compounds, larger plants are found to produce acids containing unexpectedly large amounts of insoluble high polymeric compounds that, for many end uses of the product, are undesirable constituents and represent loss of valuable phosphorus from the feed acid.

One objective of the present invention is therefore to provide a burner arrangement, and evaporation plant embodying same, by the use of which phosphoric acids may be concentrated to high $P_2O_5$ contents on a large scale for the obtaining of products having a desirable composition and, especially, a low content of insoluble compounds of the higher polyphosphoric and cyclic metaphosphoric acids.

Our investigations into the possible causes of the above mentioned anomalies in the constitution of high $P_2O_5$ content products of large-scale submerged combustion and analogous evaporators have shown that an important factor is, apparently, instability of the interface between the liquid and gases at the exhaust orifice of the usual dip tube that leads the combustion products below the surface of the acid being concentrated, due to irregularities in the flow of gases from the orifice and into the liquid. Thus, when normal design criteria are applied to the construction of a high heat-release rate burner arrangement for a large-scale evaporator, the dip tube orifice is large and the flow of gases from the dip tube into the liquid is irregular, the gas stream forming bubbles that break away from the dip tube orifice in various and fluctuating paths over and around the end of the tube, with the result that the gas/liquid interface moves irregularly over different regions of the end surface and over areas of the bore of the dip tube and of its external surface. It appears that such movement of the interface permits portions of liquid to come momentarily into contact with dip tube regions that have previously been heated to high temperature by the gas stream passing thereover, whereby such liquid portions are subject to over-concentration and form high polymeric acids and compounds thereof as solid incrustations on the dip tube regions in question. Also the gas flow irregularity conduces to small liquid portions being encapsulated in bubbles of hot gas and thereby subject to over-concentration. The incrustations may be subject to repeated sequential overheating and wetting with liquid and build up to considerable extents.

Accordingly, a more specific objective of the invention is to provide a burner arrangement, and evaporator plant embodying same, in which gas/liquid interface instability is minimised, thereby to avoid, at least substantially, the above-noted consequences of such instability.

Consideration of the possible causes of the aforesaid instability of the gas flow from the dip tube orifice of a large submerged combustion or analogous burner arrangement suggested that a critical factor could be the relationship between the volumetric flow rate of the gas from the orifice and the perimeter of the orifice (or of a dimension of some part of the dip tube near the orifice) and that because normal design criteria lead to the choice of an orifice size such as to achieve, in all burner arrangements intended to operate with the dip tube immersed to about the same depth (generally a value in the range 6 to 18 inches but sometimes up to 120 inches) in the liquid, a gas flow velocity which lies within a fairly narow range (typically a value in the range 200 to 350 feet per second for a gas temperature of 1400° C. (2540° F.)), the ratio of volumetric flow rate to orifice perimeter increases with increasing orifice size since the flow rate increases in proportion to the square of the orifice radius whereas orifice perimeter is a linear function of such radius.

Thus we were led to consider the possible importance of the radial extent of the end surface of the dip tube, surrounding the orifice, as a factor that determined the flow stability. We concluded that stable flow conditions would probably occur when the gas flowing from the dip tube orifice could form a bubble, the boundary of which lay on a substantially horizontal surface at the end of the dip tube. Experiments have shown this conclusion to be correct.

A burner arrangement in accordance with the present invention thus comprises a combustion chamber and a dip tube communicating therewith, said combustion chamber being adapted to be fed with fuel (liquid or gaseous) and oxidant, individually or in pre-mixed form, to burn in such chamber and to produce combustion products that exhaust through said dip tube, said dip tube being adapted to depend vertically into a liquid to be evaporated and having, at its lower end, an exhaust orifice surrounded by an annular surface substantially perpendicular to the dip tube axis, such orifice and surface being so dimensioned that in use of the burner arrangement the combustion products form a bubble the periphery of which lies on such surface.

The said annular surface at the lower end of the dip tube may be planar but preferably is frusto-conical or curved, whereby its inner periphery is somewhat below its outer periphery, so that stable flow of combustion products outwardly over such annular surface is promoted.

We have found that the radial extent (L) of the said annular suface (as projected on a plane perpendicular to the dip tube axis) should have a value given by the following formula:

$$L = kR(Q^a - 1)$$

wherein:

R is the radius of the said exhaust orifice;
Q is the heat release rate of the burner arrangement in millions of B.t.u. per hour;
k is not less than 0.6 and preferably not less than 0.9;
a has a value in the range 0.29–0.32 and is preferably 0.3.

Desirably the lower end of the dip tube is surrounded by a shroud to promote, in use of the burner arrangement, stable and symmetrical circulation of liquid in the region of the immersed portion of the dip tube, such shroud thereby tending to stabilize the flow of combustion products over the outer periphery of the said annular surface at the lower end of the tube by preventing unstable and asymmetric liquid flows in the region of the lower end of the dip tube from disturbing the desired smooth sheet-like flow of combustion products over said annular surface. Said shroud preferably is of frusto-conical form, coaxial with the orifice of the dip tube, and desirably has its lower end positioned at such distance below the lower end of the dip tube as to capture all combustion products exhausting from the dip tube orifice and the shroud extending upwardly and outwardly to a height such as to extend, in use of the burner arrangement, near to or beyond the liquid level.

Such circulation of liquid promoted by said shroud ensures that the outer aspect of the dip tube is thoroughly and uniformly washed by the liquid, conducing to good and uniform transfer of heat from this region of the dip tube to the liquid and thereby enhancing thermal efficiency as well as avoiding the development of local hot spots on parts of the dip tube and minimising the building of incrustations of polymeric phosphates.

With such a shroud, combustion products and entrained liquid are thoroughly mixed to produce excellent transfer of heat from the combustion products to the liquid, the liquid separating from the gases above the shroud falling to the outside of thereof to return substantially uniformly and symmertically to the region of dip tube orifice.

Desirably the combustion chamber and the dip tube together constitute a passage the cross-section of which diminishes towards the dip tube orifice, whereby the flow of combustion products has a high velocity in the region of the orifice to minimise the risk of liquid rising into the dip tube upon any momentary change in combustion conditions.

Moreover, desirably the burner arrangement includes means for injecting a gaseous fluid, such as air, into the bore of the dip tube so as, inter alia, to adjust the average temperature of the gases to a suitable value and to increase gas velocity through the dip tube orifice. In a typical embodiment of the invention, the injected gaseous fluid is adapted to form a shell lining the dip tube orifice and flowing over the inner region of the annular end surface of the tube, thereby restricting heat transfer from the combustion products to the dip tube and, consequently, the development of undesirably high temperatures on those surfaces likely to be intermittently wetted by the liquid.

The invention also includes an evaporator embodying a burner arrangement as above described. Such an evaporator is characterised by the incorporation of a hot well of small volume and into which the dip tube of the burner arrangement depends whereby the volume of liquid subjected to heating is restricted and rapid heating thereof achieved, so that the liquid is subject to minimum retention at the temperature required to effect evaporation. This is particularly important in the concentrating of phosphoric acids to high $P_2O_5$ contents since extended retention at high temperatures conduces to the formation of undesired insoluble compounds of the higher polyspheric and cyclic metaphosphoric acids.

A typical burner arrangement in accordance with the invention, incorporated in an evaporator designed to effect concentration of phosphoric acid of $P_2O_5$ content about 54% w./w. to "astrophosphoric" acid of $P_2O_5$ content about 80% w./w. at a throughput of at least 50 tons $P_2O_5$ per day is illustrated by way of non-limitative example in the accompanying drawings, in which:

FIGURE 3 is a vertical sectional view of the burner arrangement of the evaporator of FIGURE 1.

Figure 1:
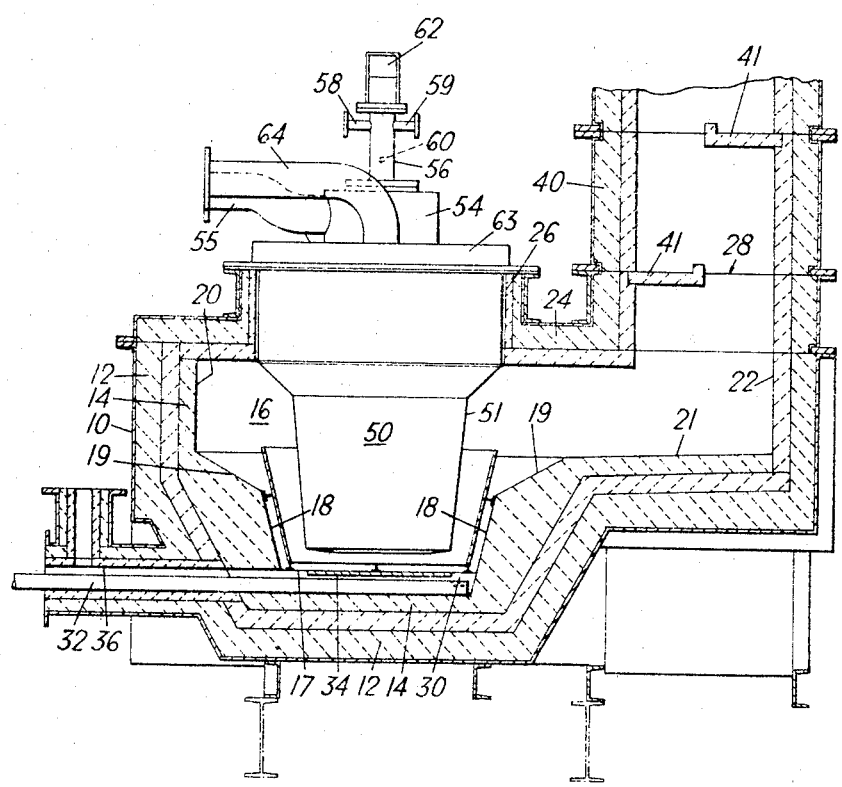
FIGURE 1 is a vertical sectional view of an evaporator incorporating a burner arrangement in accordance with the invention, the section being taken on line I—I of FIGURE 2.
Figure 2:
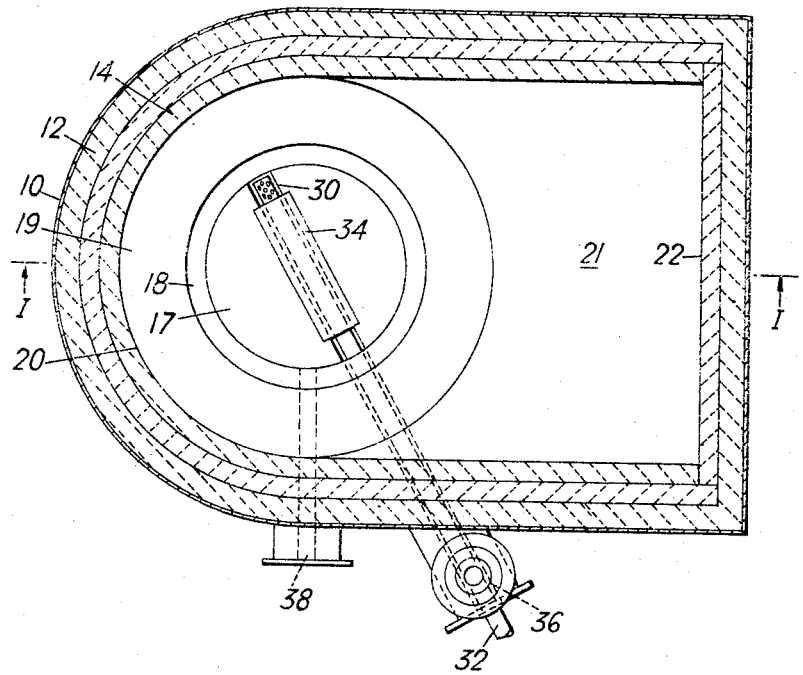
FIGURE 2 is a plan view of the evaporator of FIGURE 1, with the cover and burner arrangement removed for clarity.

The evaporator illustrated in FIGURES 1 and 2 of the drawings comprises a shell 10, for instance of lead-lined mild steel or of stainless steel so as to resist corrosion by acid contacting same by leakage through the linings described below, such shell 10 being internally lined with an outer lining 12 of acid-resisting masonry and, except for the base of the hot well described below, an inner lining 14 of two courses of carbon bricks. The shell 10 is approximately rectangular in plan (see FIG. 2) with one semi-circular end, having an overall length of about 10′ 6″, a width of about 8′ and an overall height of about 5′.

The shell 10 and its linings 12, 14 are shaped to provide a hot well 16 of generally truncated conical shape, the axis of which is vertical and coincides with the centre of curvature of the semi-circular end of the shell, the hot well 16 having a base 17 of diameter of about 36″ with a wall 18 that slopes upwardly and outwardly to a diameter of about 44″ at a height of about 12″ above the base 17, the wall 18 then continuing as at 19 with a greater outward slope to a diameter of about 68″ at a height of 22″ above the well base 17. The inner (exposed) course of lining 14 at the base of the hot well 17 is constituted by fused alumina refractory bricks. Above this height, the well 16 is bounded by vertical walls 20 conforming in plan outline with the plan shape of the shell. At the side of the well 16 remote from the semi-circular end of the shell, the wall 20 of the shell has a substantially horizontal step 21 running out to the vertical end surface 22 of the inner lining of the shell, such step 21 rising to a height of about 23″ above the well base 17 at the junction of the step 21 and said vertical end surface 22.

The shell has a top cover 24 with an aperture 26 over the hot well and a rectangular effluent outlet aperture 28, about 68″ x 19″, one longer side of which aligns with the vertical surface 22 of the shell inner lining 14 at the end of said step 21.

The base 17 of the hot well is formed with a diametral channel 30 about 4″ wide and 4″ deep that is aligned with coaxial acid inlet and outlet pipes extending through the wall of the shell 10 and its linings 12, 14, the outlet pipe 32 being of about 3″ diameter and extending within said channel 30 to the far side of the hot well and being covered by a ½″ thick fused alumina plate 34 about 30″ long closing the central portion of the said channel. The inlet pipe 36 is constituted by the annular space between the outlet pipe and a 4″ bore through the shell wall and its linings. The shell and its linings are also fitted with a 3″ bore pipe 38 extending to the hot well 16 just above the base 17 thereof and serving as an alternative acid outlet.

The effluent outlet 28 of the said cover communicates with a rectangular-section vertical offtake duct 40 fitted internally with baffles 41 to deflect the effluent from side to side to cause deposit of entrained liquid in the effluent. Depending upon product requirements, the upper region of the offtake duct may be fitted with means for introducing a phosphoric acid solution to flow over baffles 41 in the duct 40 to condense phosphoric acid vapour in the effluent and return same to the evaporator as a reflux and feed component. Alternatively, the offtake duct 40 may be fitted with at least one bubble tray or like device (not shown) irrigated with a phosphoric acid solution to condense and absorb phosphoric acid vapour and produce a side stream product having a low content of impurities and a $P_2O_5$ content of about 50% w./w. (IFB), constituting a valuable intermediate for the production of, for instance, industrial grade phosphoric acid and phosphates.

The offtake duct 40 leads the effluent to suitable effluent-treatment equipment which is desirably as disclosed in our copending application Serial No. 440,184.

Figure 4:
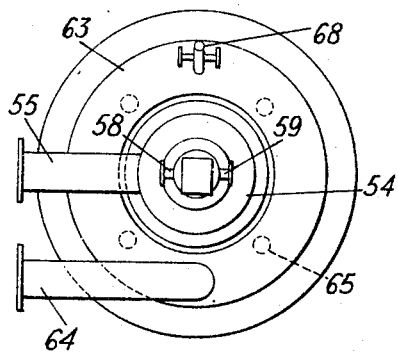
FIGURE 4 is a plan view of the burner arrangement of FIGURE 3.

The cover aperture 26 over the hot well 16 of the evaporator mounts a burner arrangement, shown separately in FIGURES 3 and 4, that in this embodiment of the invention is designed for a heat-release rate (Q) of about 8 million B.t.u. per hour and comprises an inverted frusto-conical dip tube 50 depending accurately vertically into the hot well 16 and having an outer shell 51 of a suitable acid-resistant metal lined with refractory and closed at its upper end by a refractory plug 52 with a central aperture 53. The interior of the dip tube 50 defines a frusto-conical passage tapering from a diameter of about 23″ to an exhaust orifice diameter of about 15″ ($R=7.5″$) at its lower end.

Above the refractory plug 52, the burner arrangement includes a fuel mixture chamber 54 adapted to be fed with a mixture of fuel (natural) gas and air through a suitable inlet pipe 55. Such chamber 54 communicates with the interior of the dip tube 50 via the said central aperture 53 in the refractory plug 52, which aperture is coaxially fitted with a pilot tube 56 surrounded by a set of helically-arranged pipes 57 whereby the gas/air mixture passing from the mixture chamber 54 to the dip tube through said pipes 57 is given rotational motion.

The pilot tube 56 is fitted with a tube 58 for feeding gas thereto, a tube 59 for purging the pilot tube 56 and a spark plug 60 for igniting gas fed through tube 58 to produce a pilot flame extending into the head of the dip tube passage. The upper end of the pilot tube 56 is closed by a transparent disc 61 surmounted by a mirror 62 whereby the flame in the dip tube may be observed.

The head of the dip tube further mounts an annular secondary air chamber 63 adapted to be fed with air through a suitable inlet 64. Such chamber 63 connects with the upper ends of a plurality (e.g. four) ducts 65 extending through the refractory plug 52 and within the dip tube wall at intervals therearound, such ducts 65 leading to an annular chamber 66 within the dip tube wall, the ring axis of such chamber 66 being about 6" above the lower end of the dip tube. Such chamber 66 has an outlet in the form of a slot 67 in the inner wall of the dip tube 50 at a height about 5" above the lower end of the latter.

A tube 68 extends through the plug 52 and terminates, outside the head of the dip tube, in a photocell-type of flame sensor (not shown) forming part of an automatic flame-failure alarm system of conventional type.

The lower end of the dip tube 50 is defined by an annular acid-resisting thermally conductive plate or surface 70 that is dished so that its radii are upwardly and outwardly inclined at an angle of about 5° to the horizontal. Its internal diameter matches that of the dip tube at its lower end, i.e. about 15" and its outer diameter is about 27"; that is, its radial extent is about 6".

The lower end of the dip tube 50 is externally embraced by a frusto-conical shroud 72 of acid-resisting material, this shroud 72 having an axial length of about 19" and upper and lower end diameters of 42" and 33" respectively. Its lower end is positioned about 2" below the plane of the dip tube orifice.

The burner arrangement is supported by the evaporator cover so as to depend accurately vertically into the hot well of the evaporator and coaxially of such hot well, with the dip tube orifice positioned about 3" above the base 17 of the hot well 16. The shroud 72 thus has its lower end about 1" above the base of the hot well.

In operation, and when steady state conditions have been achieved, wet-process phosphoric acid at a $P_2O_5$ content of about 54% w./w. is continuously fed into the hot well of the evaporator via the acid inlet pipe 36 and concentrated acid at a $P_2O_5$ content of about 80% w./w. is withdrawn continuously via one or other of the acid outlet pipes 32, 38, the rates of feed and withdrawal being respectively controlled by temperature and level sensing devices, the former in the hot well. A gas/air mixture and secondary air are respectively supplied to the appropriate head chambers 54, 63 of the burner arrangement, the mixture passing into the upper, combustion chamber-constituting, part 73 of the dip tube passage to burn therein and produce hot products of combustion that flow towards the dip tube orifice, being maintained at high velocity by the convergence of the passage and by the entry of secondary air from said slot 67 in the dip tube wall just above the orifice thereof. Such secondary air cools the gas stream and some flows over the inner region of the end plate 70 to minimise the development of hot spots on areas subject to intermittent wetting by the acid.

The flow rates of gas/air mixture and secondary air are adjusted to give rise to a stable flow of combustion products and air from the orifice of the dip tube at such a rate as to maintain a flat bubble of gases over the lower end of the dip tube with its boundary at all times located on the said end plate 70 of the dip tube.

Referring to the formula given hereinabove it will be observed that the radial extent (L) of the plate 70 is just in excess of the preferred minimum value ($L=5.85''$) obtained by substituting $R=7.5$, $k=0.9$ and $a=0.3$ in the formula when $Q=8$; assuming complete stability of combustion, liquid level (nominal) and pressure within the evaporator, mainly stable operation at $Q=8$ could be expected with a radial extent (L) of 3.75" obtained by substitution of the minima ($k=0.6$, $a=0.29$) for the constants in the formula, values that imply location of the bubble periphery on the peripheral margin of the plate 70. Selection of the preferred value (0.3) for the exponent $a$ implies an adequate tolerance for combustion irregularities (variations in fuel calorific value and the transient fluctuations that may be expected with a suitable sensitive and stable combustion control system) whilst higher values of $a$ up to 0.32 provide yet greater tolerance to combustion irregularities and, particularly, to liquid flow irregularities in the vicinity of the dip tube lower end, for instance in the absence of the circulation-promoting shroud 72. The coefficient $k$ is significant of the location of the bubble periphery on the plate 70; the value 0.9 for this coefficient implies location of the bubble periphery at the mean radius of the plate 70.

Thus whilst the burner assembly as so far described has the optimum design for $Q=8$, satisfactory operation with careful control should be possible at higher values of Q, the highest value derivable from the formula being $Q=18.6$ that is, a heat-release rate in excess of 18 million B.t.u./hour. As hereinafter described, the illustrated evaporator has demonstrated completely stable operation in concentrating wet-process phosphoric acid to $P_2O_5$ contents of up to 79% w./w. with burner heat-release rates up to 13 million B.t.u./hour.

The following tabulation illustrates the performance of the evaporator described above in concentrating wet-process phosphoric acid in five experimental runs using such evaporator:

| Run No | 1 | 2 | 3 | 4 | 5 |
| --- | --- | --- | --- | --- | --- |
| Feed Acid: | | | | | |
| $P_2O_5$, percent w./w. | 57.4 | 56.4 | 57.7 | 57.8 | 58.8 |
| $SO_3$, percent w./w. | 5.8 | 5.8 | 5.6 | 6.2 | 6.1 |
| $Fe_2O_3+Al_2O_3$, percent w./w. | 1.8 | 1.9 | 1.8 | 1.6 | -------- |
| Fluorine, percent w./w. | 0.8 | 0.8 | 0.78 | 0.78 | 0.8 |
| Water Insol. Solids, percent w./w. | 0.3 | 0.67 | 0.28 | 0.29 | 0.39 |
| Rate of feed, tons $P_2O_5$ day | 88 | 86 | 113 | 106 | 88 |
| Temperature, °F | 70 | 75 | 75 | 75 | 75 |
| Burner Heat Release: | | | | | |
| B.t.u./hour | 9.35×10⁶ | 9.35×10⁶ | 11×10⁶ | 13×10⁶ | 11×10⁶ |
| Product Acid: | | | | | |
| $P_2O_5$, percent w./w. | 74.5 | 75.4 | 76.2 | 79.0 | 79.6 |
| Water Insol. Solids, percent w./w. | 0.75 | 1.1 | 1.6 | 3.6 | 5.2 |
| Citrate Insol. $P_2O_5$, percent w./w. | 0.26 | 0.37 | 0.56 | 1.25 | 1.8 |
| Percent $P_2O$ converted to polyacids | 73 | 79 | 80 | 86 | 86 |
| Evaporation Temperature, °F | 640 | 645 | 680 | 700 | 750 |
| Percent of $P_2O_5$ input carried into effluent treatment system | 4.4 | 5.0 | 3.2 | 5.4 | 9.3 |

It will be observed that successive runs were made with progressively higher evaporation temperatures (boiling point of product acid within the evaporator) to achieve progressively greater $P_2O_5$ contents in the product.

It is significant that although all the runs were made with burner heat release rates significantly higher than the design value (but less than the 18.6 million B.t.u./hour maximum computed from the formula), the trend of insoluble content of the product acid is closely related to the evaporation temperature, showing that stable burner operation occurred in all runs since bubble instability at the dip tube orifice would have been marked by an anomalously high insoluble content of the product. At the 13 million B.t.u./hour heat release rate of run 4 the bubble periphery was clearly still located on the plate 70.

Finally it should be pointed out that the tabulated values for $P_2O_5$ carried into the effluent-treatment system are remarkably low for a submerged combustion evaporator concentrating phosphoric acid, a further indication of the stability and completeness of the gas/liquid contact process occurring in the evaporator. Thus the employment of a burner arrangement in accordance with the invention in a submerged combustion evaporator unit appropriately designed for use therewith shows great practical and economic advantages, over conventional arrangements, in reducing the load on the exhaust effluent-treating system, a matter of consequence not only in the concentration of phosphoric acid but also in the concentration of other solutions the submerged combustion evaporation of which gives rise to an effluent containing valuable and/or noxious constituents.

Whilst the described burner arrangement and evaporator embodying same are particularly suited to the concentration of wet-process phosphoric acids to high $P_2O_5$ content on a large scale and with low contents of undesired insoluble polyphosphates, it will be understood that burner arrangements and evaporators in accordance with the invention are of widespread application, being, of course, of particular utility in the evaporation or concentration of liquids that are sensitive to high temperatures, such as sulphuric acid, boric acid, iron chloride, crude oil and heavy petroleum fractions, tartaric acid.

We claim:

1. A burner arrangement for a submerged heater apparatus comprising: a combustion chamber; means for conducting fuel and oxidant to said combustion chamber; means for conducting fuel and oxidant to said combustion chamber for combustion therein; a dip tube communicating with said combustion chamber to receive combustion products produced therein and adapted to depend vertically into a liquid; an exhaust orifice at the lower end of said dip tube; an annular surface radially extending from and surrounding said exhaust orifice and being substantially perpendicular to the axis of said dip tube; said exhaust orifice and said annular surface being dimensioned to cause combustion products issuing from said orifice into said liquid to form a bubble the periphery of which lies on said surface.

2. A burner arrangement for a submerged heater apparatus comprising: a combustion chamber; means for conducting fuel and oxidant to said combustion chamber for combustion therein; a dip tube communicating with said combustion chamber to receive combustion products produced therein and adapted to depend vertically into a liquid; an exhaust orifice at the lower end of said dip tube; an annular surface radially extending from and surrounding said exhaust orifice and being substantially perpendicular to the axis of said dip tube; said annular surface having a radial extent (L) as determined by the formula:

$$L = kR(Q^a - 1)$$

wherein:

R is the radius of the said exhaust orifice
Q is the heat release rate of the burner arrangement in millions of B.t.u./hour
k is at least 0.6
a has a value in the range 0.29 to 0.32.

3. A burner arrangement for a submerged heater apparatus comprising: a combustion chamber; means for conducting fuel and oxidant to said combustion chamber for combustion therein; a dip tube communicating with said combustion chamber to receive combustion products produced therein and adapted to depend vertically into a liquid; an exhaust orifice at the lower end of said dip tube; an annular surface radially extending from and surrounding said exhaust orifice and being substantially perpendicular to the axis of said dip tube; said annular surface having a radial extent (L) as determined by the formula:

$$L = kR(Q^a - 1)$$

wherein:

R is the radius of said exhaust orifice
Q is the heat release rate of the burner arrangement in millions of B.t.u./hour
k is 0.9
a has a value in the range 0.29 to 0.32.

4. The burner arrangement of claim 3, wherein the exponent a has the value 0.30.

5. The burner arrangement of claim 4, wherein said annular surface has its inner periphery, bounding said exhaust orifice, a small distance below its outer periphery.

6. The burner arrangement of claim 5, wherein said annular surface has its radii inclined at an angle of about 5° to a plane perpendicular to the dip tube axis.

7. The burner arrangement of claim 1, including a shroud surrounding the lower end of the dip tube.

8. The burner arrangement of claim 7, wherein said shroud is frusto-conical, coaxial with said exhaust orifice and has its lower end positioned below the level of said exhaust orifice so as to capture combustion products exhausting from such orifice.

9. The burner arrangement of claim 1, wherein said combustion chamber and dip tube together constitute a passage the cross-sectional area of which diminishes towards the dip tube exhaust orifice.

10. The burner arrangement of claim 1, including means for injecting gaseous fluid into the bore of the dip tube.

11. The burner arrangement of claim 10, including an annular chamber within the dip tube wall, means for feeding gaseous fluid to such chamber, and an annular discharge slot communicating with said chamber and opening into the bore of the dip tube for injection of gaseous fluid adjacent to the exhaust orifice.

12. A submerged heater apparatus comprising a vessel for liquid to be heated; a hot well within said vessel; a liquid inlet and a liquid outlet both communicating with said hot well near the base thereof; a burner arrangement including a combustion chamber; means for conducting fuel and oxidant to said combustion chamber for combustion therein; a dip tube communicating with said combustion chamber to receive combustion products produced therein and depending vertically into said hot well; an exhaust orifice at the lower end of said dip tube; an annular surface radially extending from and surrounding said exhaust orifice and being substantially perpendicular to the dip tube axis; said exhaust orifice and said annular surface being dimensioned to cause combustion products issuing from said orifice into liquid in said hot well to form a bubble the periphery of which lies on said surface.

13. A submerged heater apparatus comprising a vessel for liquid to be heated; a hot well within said vessel; a liquid inlet and a liquid outlet both communicating with said hot well near the base thereof; a burner arrangement including a combustion chamber; means for conducting fuel and oxidant to said combustion chamber for combustion therein; a dip tube communicating with said combustion chamber to receive combustion products produced therein and depending vertically into said hot well; an exhaust orifice at the lower end of said dip tube; an annular surface radially extending from and surrounding said exhaust orifice and being substantially perpendicular to the dip tube axis; said annular surface having a radial extent (L) as determined by the formula:

$$L = kR(Q^a - 1)$$

wherein:

R is the radius of the said exhaust orifice

Q is the heat release rate of the burner arrangement in millions of B.t.u./hour $k$ is at least 0.6

$a$ has a value in the range 0.29 to 0.32.

14. A submerged heater apparatus comprising a vessel for liquid to be heated; a hot well within said vessel; a liquid inlet and a liquid outlet both communicating with said hot well near the base thereof; a burner arrangement including a combustion chamber; means for conducting fuel and oxidant to said combustion chamber for combustion therein; a dip tube communicating with said combustion chamber to receive combustion products produced therein and depending vertically into said hot well; an exhaust orifice at the lower end of said dip tube; an annular surface radially extending from and surrounding said exhaust orifice and being substantially perpendicular to the dip tube axis; said annular surface having a radial extent (L) as determined by the formula:

$$L = kR(Q^a - 1)$$

wherein:

R is the radius of said exhaust orifice

Q is the heat release rate of the burner arrangement in millions of B.t.u./hour $k$ is 0.9

$a$ has a value in the range 0.29 to 0.32.

15. The apparatus of claim 12, wherein said dip tube occupies the major portion of the volume of the hot well and is symmetrically disposed therein.

16. The apparatus of claim 15, said hot well having a frusto-conical lower wall portion coaxial with said dip tube and said burner arrangement including a frusto-conical shroud surrounding the lower end of said dip tube and coaxial therewith, such shroud terminating above the base of the hot well and below the lower end of the dip tube, the shroud and the dip tube together defining an inner annular passage for upflow of liquid mixed with combustion products and said shroud and said wall portion together defining an outer annular passage for downflow return of liquid to the base of the hot well.

17. The apparatus of claim 16, including an exhaust effluent offtake duct extending upwardly at a position laterally spaced from the dip tube, said duct communicating with the upper part of the hot well via a substantially horizontal passage.

18. The apparatus of claim 17, including superposed staggered baffles in said offtake duct for disentraining liquid entrained in the exhaust effluent entering such duct.

References Cited by the Examiner

UNITED STATES PATENTS

| | | | |
|---|---|---|---|
| 1,730,440 | 10/1929 | Smith | 126—360 |
| 2,530,271 | 11/1950 | Swindin | 126—360 |
| 2,607,661 | 8/1952 | See | 126—360 |
| 2,611,681 | 9/1952 | Bellinger | 23—165 |
| 2,723,659 | 11/1955 | Young et al. | 126—360 |
| 2,902,029 | 9/1959 | Hill | 126—360 |

FOREIGN PATENTS

| | | |
|---|---|---|
| 162,785 | 4/1949 | Austria. |
| 292,736 | 6/1928 | Great Britain. |

FREDERICK L. MATTESON, JR., *Primary Examiner.*

R. A. DUA, *Assistant Examiner.*

UNITED STATES PATENT OFFICE
CERTIFICATE OF CORRECTION

Patent No. 3,276,443　　　　　　　　　　　　　　　October 4, 1966

James Austin et al.

It is hereby certified that error appears in the above numbered patent requiring correction and that the said Letters Patent should read as corrected below.

Column 1, line 15, for "pohsphoric" read -- phosphoric --; line 44, for "neverthless" read -- nevertheless --; column 2, line 38, for "appears" read -- appear --; column 4, line 9, for "forma" read -- form a --; column 5, line 1, for "symmertically" read -- symmetrically --; column 8, in the table, under the heading "Run No.", line 29, for "$P_2O$" read -- $P_2O_5$ --; column 9, lines 32 and 33, strike out "means for conducting fuel and oxidant to said combustion chamber".

Signed and sealed this 5th day of September 1967.

(SEAL)
Attest:

ERNEST W. SWIDER　　　　　　　　　　　　　　EDWARD J. BRENNER
Attesting Officer　　　　　　　　　　　　　Commissioner of Patents